(No Model.)

H. M. DU BOIS.
TIRE FOR VEHICLE WHEELS.

No. 431,512. Patented July 1, 1890.

WITNESSES:
P. F. Eagle.
L. Douville.

INVENTOR
Howard M. Du Bois.
BY
John A. Wiedersheim.
ATTORNEY.

UNITED STATES PATENT OFFICE.

HOWARD M. DU BOIS, OF PHILADELPHIA, PENNSYLVANIA, ASSIGNOR TO THE DU BOIS MANUFACTURING COMPANY, OF PENNSYLVANIA.

TIRE FOR VEHICLE-WHEELS.

SPECIFICATION forming part of Letters Patent No. 431,512, dated July 1, 1890.

Application filed March 1, 1890. Serial No. 342,255. (No model.)

*To all whom it may concern:*

Be it known that I, HOWARD M. DU BOIS, a citizen of the United States, residing in the city and county of Philadelphia, State of Pennsylvania, have invented a new and useful Improvement in Tires for Vehicle-Wheels, which improvement is fully set forth in the following specification and accompanying drawings.

My invention consists of a tire for a vehicle-wheel having on its inner face a semi-cylindrical rib or tongue which enters a groove in an elastic cushion, which is interposed between the tire and fellies of the wheel, said tire having also flanges on its sides, the same embracing said cushion, the tire being upset, by which provision the tire may be firmly and securely seated on the cushion.

Figure 1:
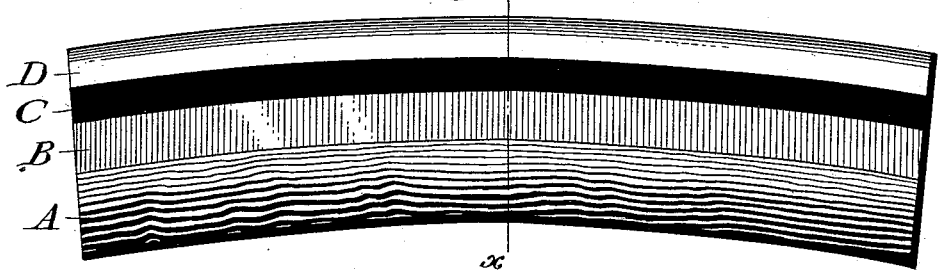
Figure 2:
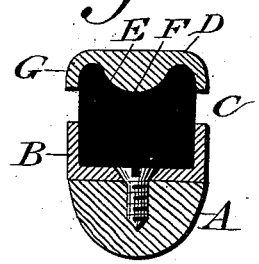
Figure 3:
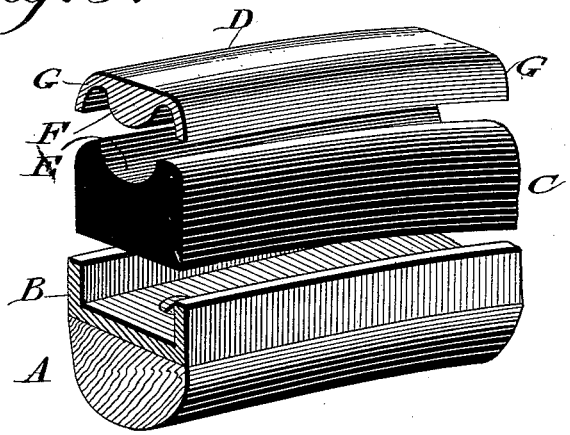

Figure 1 represents a side elevation of a portion of a tire embodying my invention. Fig. 2 represents a section thereof on line *x x*, Fig. 1. Fig. 3 represents a perspective view, the parts being separated.

Similar letters of reference indicate corresponding parts in the several figures.

Referring to the drawings, A designates a portion of a felly of a vehicle-wheel, to which is screwed or otherwise fastened the channeled plate B.

C designates an elastic cushion, which is interposed between the tire D of the wheel and said plate B, and having its inner peripheral portion located within the side walls or flanges of said plate. The outer periphery of the cushion C has a circumferential groove E, and the inner periphery of the tire is formed with a circumferential rib or tongue F, which enters said groove, and the tire is furthermore formed with side flanges G, which project inwardly and embrace the sides of the outer peripheral portion of the cushion D. The tongue is wide and deep, whereby the thickness of the tire is centrally preserved.

When the parts are primarily located in position, the tire, which is integral, is upset, whereby its diameter is reduced, and it thus embraces the cushion and holds the latter upon the plate B. The tongue F, entering the groove E, serves to compress the central portion of the cushion to a certain but uninjurious extent, and as said tongue is of semi-cylindrical form its tendency is to distend the outer peripheral portion of the cushion in lateral direction, the same being, however, resisted by the flanges G and thus confined within the same, whereby the cushion is held firmly and true between the plate and tire, and the latter remains seated on said cushion in a secure and reliable manner, the general elasticity of the cushion being preserved.

The side flanges G are rounded and embrace the rounded and contiguous portions of the cushion C, and as the groove E is of semi-cylindrical form, or nearly so, to accord with the shape of the tongue F, there is no cutting action of the tire upon the cushion, it being noticed that angles on the inner periphery of the tire are avoided by the construction presented.

If desired, the plate B may be an integral portion of the felly, instead of a separate piece, as shown.

Having thus described my invention, what I claim as new, and desire to secure by Letters Patent, is—

A vehicle-wheel having a channeled plate, an elastic cushion therein, and a surrounding tire, the latter being provided with a semi-cylindrical tongue which enters a semi-cylindrical groove in said cushion, and flanges which embrace the sides of the same, said tire with its tongue and flanges being upset, the parts being combined substantially as described.

HOWARD M. DU BOIS.

Witnesses:
JOHN A. WIEDERSHEIM,
WM. C. WIEDERSHEIM.